United States Patent
Miura (10) Patent No.: US 8,521,048 B2
(45) Date of Patent: Aug. 27, 2013

(54) PRINTING APPARATUS, PRINTING APPARATUS CONTROL METHOD, AND STORAGE MEDIUM

(75) Inventor: Shigeo Miura, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 275 days.

(21) Appl. No.: 12/948,550

(22) Filed: Nov. 17, 2010

(65) Prior Publication Data

US 2011/0135335 A1   Jun. 9, 2011

(30) Foreign Application Priority Data

Dec. 4, 2009   (JP) ................................ 2009-276328

(51) Int. Cl.
G03G 15/20   (2006.01)

(52) U.S. Cl.
USPC ................. 399/67; 399/33; 399/69; 399/122; 399/320

(58) Field of Classification Search
USPC .......................... 399/33, 67, 69, 70, 122, 320
See application file for complete search history.

(56) References Cited

U.S. PATENT DOCUMENTS

| 2006/0271802 | A1  | 11/2006 | Yanagawa |
| 2008/0007796 | A1* | 1/2008  | Sato ............................. 358/448 |
| 2009/0208235 | A1* | 8/2009  | Yoon ............................. 399/67 |
| 2010/0303528 | A1* | 12/2010 | Yamamoto ................... 399/364 |

FOREIGN PATENT DOCUMENTS

| CN | 1916782 A    | 2/2007  |
| CN | 101086637 A  | 12/2007 |
| JP | 2004-333878 A | 11/2004 |
| JP | 2005-156624 A | 6/2005  |

* cited by examiner

*Primary Examiner* — Walter L Lindsay, Jr.
*Assistant Examiner* — Roy Y Yi
(74) *Attorney, Agent, or Firm* — Canon USA, Inc., IP Division

(57) ABSTRACT

An image forming apparatus having an image forming unit and a fixing unit. The image forming unit may form an image on a sheet based on image data by using a recording agent. The fixing unit may fix the recording agent on the sheet. The image forming apparatus may include a control unit to receive the image data and transmit the received image data to the image forming unit and a determination unit to determine a type of an interface via which the image data has been received. The control unit additionally determines whether to start raising a temperature of the fixing unit before the image data becomes ready to be transmitted to the image forming unit based on the type of the interface determined by the determination unit.

5 Claims, 9 Drawing Sheets

PRINTING APPARATUS, PRINTING APPARATUS CONTROL METHOD, AND STORAGE MEDIUM

BACKGROUND OF THE INVENTION

1. Field of the Invention

The present invention relates to a printing apparatus, a printing apparatus control method, and a storage medium.

2. Description of the Related Art

A conventional printing apparatus discussed in Japanese Patent Application Laid-Open No. 2004-333878 uses a fixing device to fix a toner on a sheet in executing printing. A conventional printing apparatus like this executes preheating, which is heating processing executed before printing, by previously applying a heat to the fixing device.

If a print instruction is input from a personal computer (PC) to a conventional printing apparatus like this, a time required from the start of the instructed printing until a first sheet to be printed is printed can be reduced by starting heating of the fixing device even if an image to be printed has not been ready yet (i.e., if the image to be printed has not been stored or rasterized yet).

In recent years, a conventional printing apparatus has been used that uses a fixing device having a small thermal capacity. A fixing device of this type is referred to as an "on-demand fixing device" or a "surf-fixing device". If a fixing device of this type is used, costs, an amount of consumed energy, and the size of the apparatus can be reduced.

However, the life of the fixing device of this type is short. Accordingly, if an image is recorded by using a fixing device having a small thermal capacity, the life of the fixing device may expire very soon if the fixing device is always preheated.

Therefore, it may be useful to restrict execution of preheating so that the fixing device is not preheated unless a print instruction is input. However, in this case, if preheating is executed too much, the life of the fixing device may be consumed very soon.

SUMMARY OF THE INVENTION

In an embodiment, an image forming apparatus has an image forming unit and a fixing unit. The image forming unit may form an image on a sheet based on image data by using a recording agent. The fixing unit may fix the recording agent on the sheet. The image forming apparatus may include a control unit to receive the image data and transmit the received image data to the image forming unit and a determination unit to determine a type of an interface via which the image data has been received. The control unit additionally determines whether to start raising a temperature of the fixing unit before the image data becomes ready to be transmitted to the image forming unit based on the type of the interface determined by the determination unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the present invention.

DESCRIPTION OF THE EMBODIMENTS

Various exemplary embodiments, features, and aspects of the invention will be described in detail below with reference to the drawings.

Figure 1:
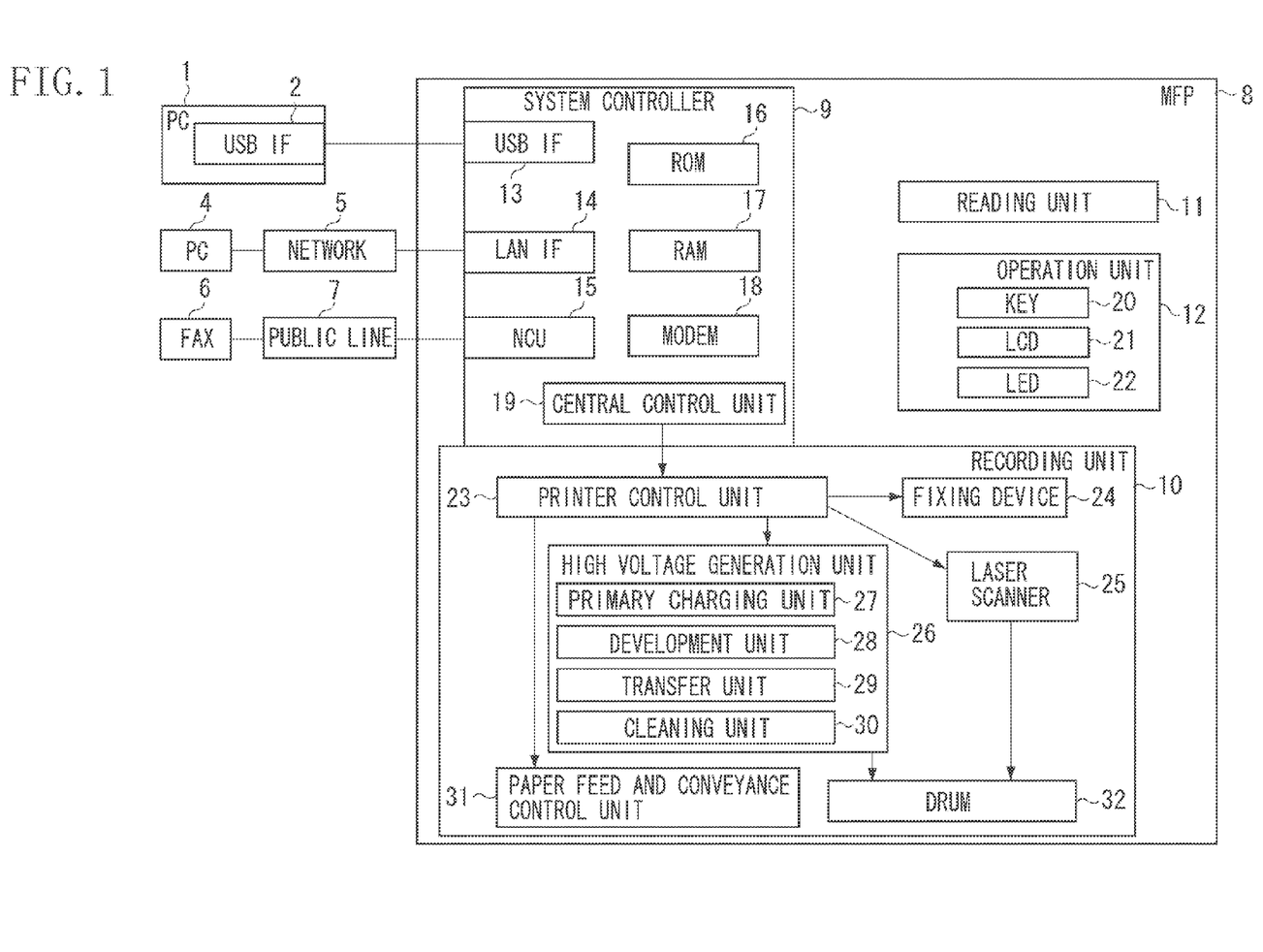
FIG. 1 is a block diagram illustrating an exemplary configuration of an image forming system according to an exemplary embodiment of the present invention.

In the following description, an image forming apparatus capable of preventing consumption of the life of a fixing device having a small thermal capacity used in printing by switching preheating on and off according to the status of the image forming apparatus will be described in detail. FIG. 1 is a block diagram illustrating an exemplary configuration of an image forming system, to which the image forming apparatus that is an example of a printing apparatus according to the present exemplary embodiment is applied.

In the example illustrated in FIG. 1, a multifunction peripheral (MFP) is used as the image forming apparatus. The MFP (image forming apparatus) according to the present exemplary embodiment is capable of communicating with a PC via a network and with a facsimile apparatus via a public line.

However, the present exemplary embodiment is not limited to this. More specifically, effects of the present invention can be implemented if a single function peripheral (SFP) is used as the image forming apparatus. The image forming apparatus according to the present exemplary embodiment includes a serial communication interface, such as universal serial bus (USB). Accordingly, the image forming apparatus can be locally connected with a PC 1.

Referring to FIG. 1, the host PC 1 is connected with the image forming apparatus 8 via an interactive local interface 2, such as USB. A USB cable 3 connects the PC 1 with the image forming apparatus 8.

A PC 4 is connected with the image forming apparatus 8 via a network 5. A communication target facsimile apparatus (FAX machine) 6 executes communication by facsimile with the image forming apparatus 8 via a public line 7. A system controller 9 controls a recording unit 10, a reading unit 11, and an operation unit 12. In addition, the system controller 9 controls the communication between the FAX machine 6 and the PCs 1 and 4. More specifically, the operation unit 12 receives an image processing request from a user, such as a FAX transmission request, a copy request, a scan request, or a box function execution request, which is input by the user according to various image processing functions.

The recording unit 10 outputs an image on a recording sheet according to an instruction from a central control unit 19. The reading unit 11 reads an image of a document fed by an automatic document feeding device (ADF) (not illustrated). In addition, the reading unit 11 outputs a digital signal of the read image data to the system controller 9.

The operation unit 12 includes a key 20. When the user operates the key 20 to input an instruction, the operation unit 12 detects an operation instructed to the recording apparatus by the user. A liquid crystal display (LCD) 21 of the image forming apparatus 8 displays various pieces of information to the user. A light-emitting diode (LED) 22 of the image forming apparatus 8 displays various pieces of information to the user.

The system controller 9 includes a USB interface 13 and a local area network (LAN) interface 14. The image forming apparatus 8 is connected to a public line via a network control unit (NCU) 15. A read-only memory (ROM) 16 is a nonvolatile a memory, which functions as a work memory for the image forming apparatus 8. A random access memory (RAM) 17 stores image data, a system program, and control data. A modem 18 is used in executing communication via facsimile.

The recording unit 10 includes a printer control unit 23. The printer control unit 23 controls the entire recording unit 10. A fixing device 24 applies heat and pressure to a toner image that has been transferred on a sheet of recording paper conveyed from a photosensitive drum 32 (not illustrated).

Figure 4A:
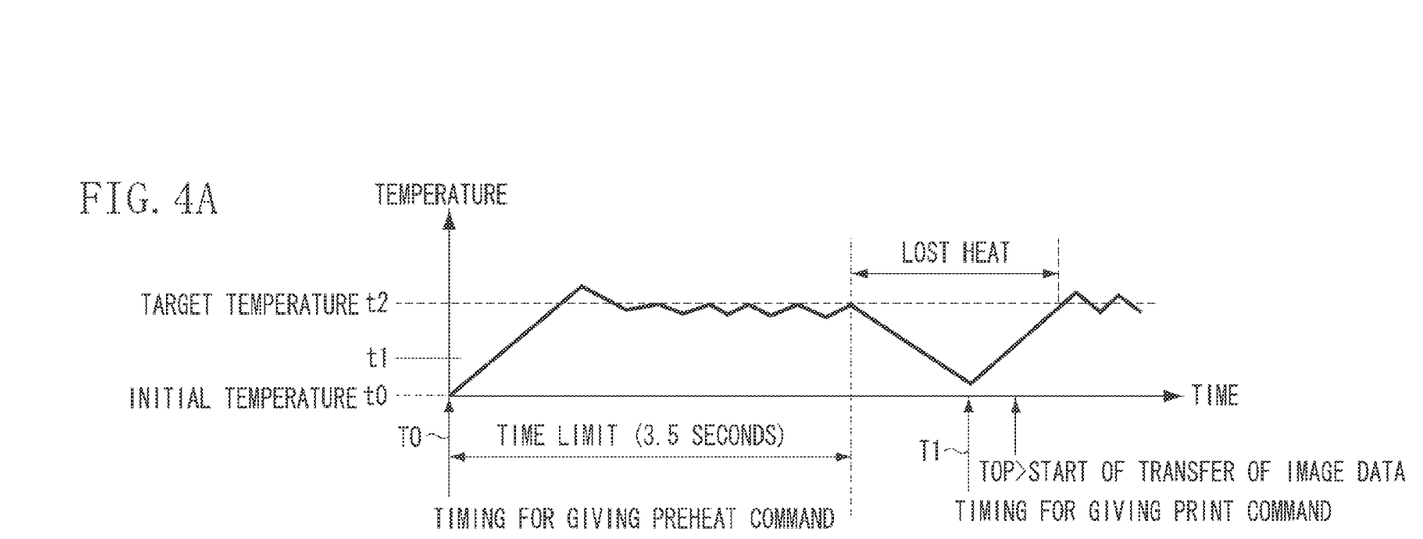
FIGS. 4A and 4B are timing charts illustrating a timing of preheating a fixing device according to an exemplary embodiment of the present invention.
Figure 4B:
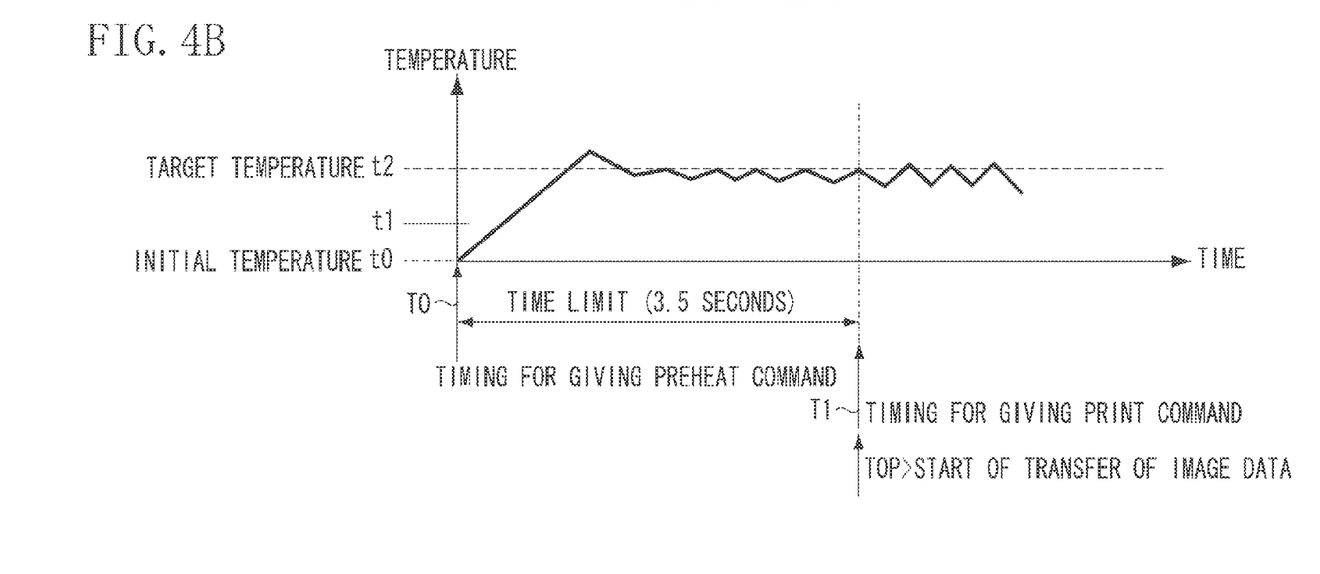

The printer control unit 23 starts the supply of power to the fixing device 24 before image formation processing starts according to a request of image formation processing, which is input by the system controller 9. In addition, the printer control unit 23 executes control (temperature raising control) for raising the temperature of the fixing device 24 to a fixation temperature within a time limit as illustrated in FIG. 4. In other words, the printer control unit 23 transforms the fixing device 24 from a first fixing device having a first temperature to a second fixing device having a second temperature.

The fixing device 24 applies heat and pressure on the recording medium to thermally fix the toner image (image formed by a recording agent, or image formed by a developer) having been transferred on the recording medium. In other words, a fixing unit configured to fix the recording agent on a sheet is configured to transform that sheet from a first sheet not having a fixed recording agent to a second sheet having a fixed recording agent. A laser scanner 25 scans a laser beam, which has been modulated according to an input video signal, on the photosensitive drum 32 via a polygonal mirror.

A high voltage unit 26 generates a high voltage potential. A primary charging device 27 evenly charges a surface of the photosensitive drum 32. In addition, the high voltage unit 26 includes a development unit 28. A transfer unit 29 of the high voltage unit 26 transfers the toner image developed on the photosensitive drum 32 onto the recording sheet conveyed thereto.

A cleaning unit 30 collects the toner remaining on the photosensitive drum 32 after image formation is executed. A paper feeding and conveyance control unit 31 controls the conveyance of the recording paper and the rotation of the photosensitive drum 32.

Figure 2:
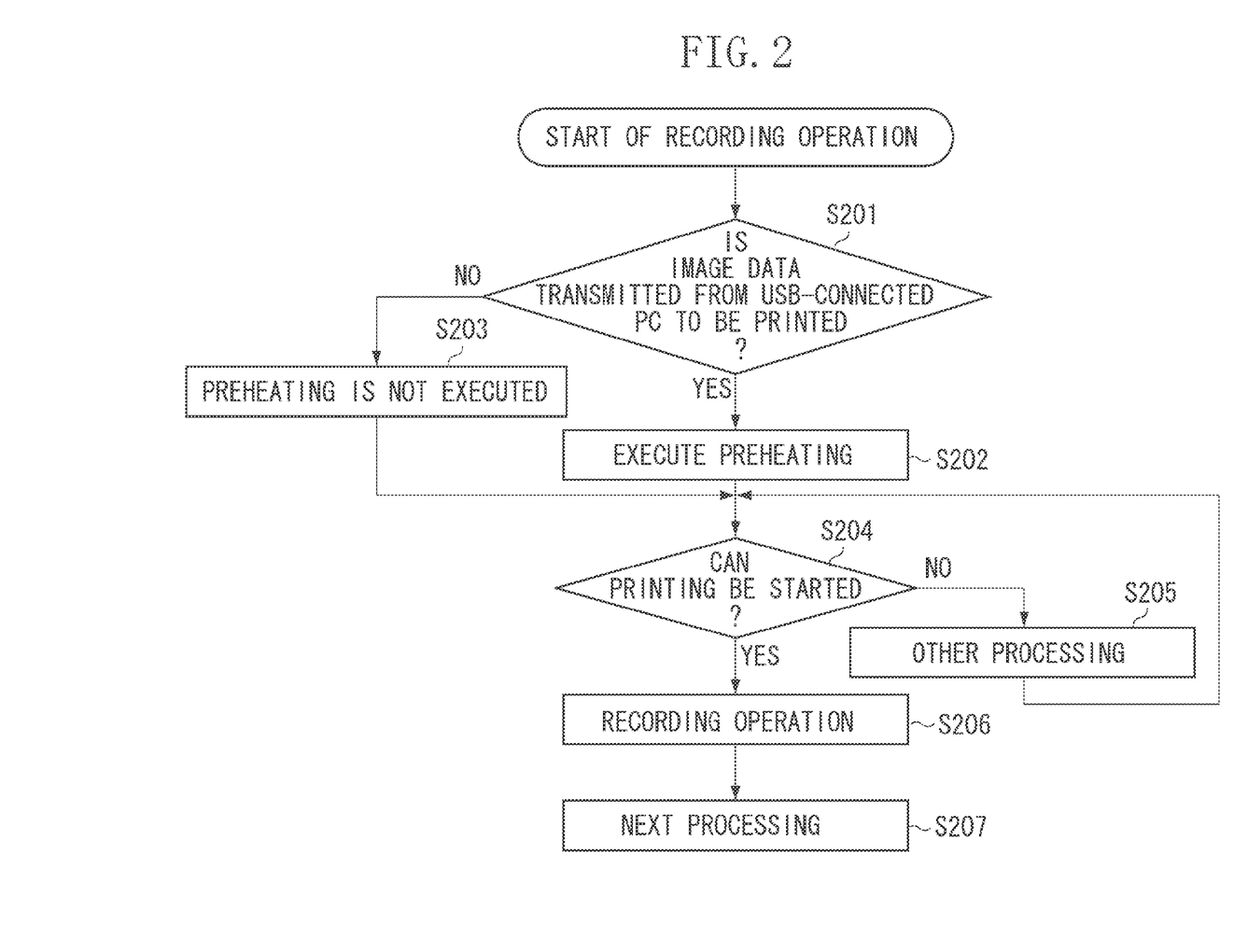
FIG. 2 is a flow chart illustrating an example of image processing executed by an image forming apparatus according to an exemplary embodiment of the present invention.

Now, an image processing operation executed by the image forming apparatus 8 with reference to a flow chart illustrated in FIG. 2. FIG. 2 is a flow chart illustrating an example of the image processing executed by the image forming apparatus 8 according to the present exemplary embodiment.

In the present exemplary embodiment, the control of preheating by the image forming apparatus 8 on the fixing device 24 is switched based on a result of determination of the type of an interface for receiving print information. Each step of the flow chart of FIG. 2 is implemented by the central control unit 19 by loading and executing a control program on the RAM 17.

Referring to FIG. 2, in step S201, the central control unit 19 determines whether image data has been transmitted from the PC 1, which is a host PC, via the USB cable 3. In the present exemplary embodiment, it is supposed that a printer driver (not illustrated) for communicating with the image forming apparatus 8 has been previously installed. A print job is received from the PC 1 by the communication via the printer driver. The image forming apparatus 8 analyzes and prints the received print job.

If it is determined that image data has been transmitted from the PC 1 via the USB cable 3 (YES in step S201), then the processing advances to step S202. In step S202, the central control unit 19 transmits a signal for instructing the start of preheating of the fixing device 24 to the printer control unit 23 of the recording unit 10 after transmission of the image data from the PC 1 has started.

In step S204, the central control unit 19 of the system controller 9 receives the image data from the PC 1, which is connected by USB. In addition, the central control unit 19 determines whether the image data to be printed by the recording unit 10 has been completely input. In other words, in step S204, the central control unit 19 determines whether printing can be started.

If it is determined that the image data to be printed by the recording unit 10 has been completely input (YES in step S204), then the central control unit 19 instructs the printer control unit 23 to start preheating of the fixing device 24. Then the processing advances to step S206. In step S206, the central control unit 19 transmits the image data to the recording unit 10. Furthermore, the central control unit 19 executes control for starting printing. In step S207, the processing advances to next processing.

On the other hand, if it is determined that the image data to be printed by the recording unit 10 has not been completely input yet (NO in step S201) or if image data has been transmitted from the PC 4 via the network 5, then the processing advances to step S203. In step S203, the central control unit 19 does not input an instruction for preheating the fixing device 24 to the printer control unit 23, and the processing then advances to step S204.

In addition, if image data (transmission data) has been received from the facsimile machine 6 via the public line 7, then it is determined "NO" in step S201. In this case, the image forming apparatus 8 does not execute preheating of the fixing device 24 and the processing advances to step S204.

In the present exemplary embodiment, a user of the PC (the host PC) 1, which is locally connected to the image forming apparatus 8, stays around the image forming apparatus 8 with a desire of printing the image data as soon as possible. In order to shorten a first print out time (FPOT), the central control unit 19 instructs the printer control unit 23 to execute control for preheating the fixing device 24 immediately after detecting the request from the locally connected PC 1 in step S201.

On the other hand, a user of the PC 4, which is connected via the network 5, is not present around the image forming apparatus 8. Accordingly, it is not necessary for the user of the PC 4 to shorten the FPOT by preheating the fixing device 24, which may unnecessarily consume the life of the fixing device 24.

Furthermore, a person who has transmitted the image via the facsimile machine 6 is usually different from a person receiving the transmitted facsimile data by using the image forming apparatus 8. Accordingly, it is not necessary for the person who has transmitted the image via the facsimile machine 6 to shorten the time for printing the image data by preheating the fixing device 24. In addition, it is not usual for the person receiving the image data by using the image forming apparatus 8 to stay before the image forming apparatus 8 waiting for the image data to be transmitted from the facsimile machine 6. Similarly, it is not necessary for the person receiving the image data by using the image forming apparatus 8 to shorten the time for printing the image data by preheating the fixing device 24, which may unnecessarily consume the life of the fixing device 24.

Accordingly, in the above-described case, it is determined "NO" in step S201. Therefore, it becomes unnecessary for the central control unit 19 to execute preheating of the fixing device 24 in step S203. As a result, the present exemplary embodiment can prevent shortening of the life of the fixing device 24.

In step S204, the central control unit 19 determines whether the printing can be started. More specifically, if print data is currently being rendered based on image data or if the central control unit 19 is currently waiting for sheets to be replenished, the central control unit 19 determines that the printing cannot be started (NO in step S204). In this case, the processing advances to step S205. In step S205, the central control unit 19 executes other processing. Then the processing returns to step S204.

On the other hand, if it is determined that the printing can be started (YES in step S204), then the processing advances to step S206. In step S206, the central control unit 19 outputs a video signal to the printer control unit 23. In addition, the printer control unit 23 outputs the video signal to the laser scanner 25. Furthermore, the central control unit 19 starts a recording operation. In step S207, the processing advances to next processing.

In the present exemplary embodiment, the central control unit 19 determines an input source of a print request that the image forming apparatus 8 receives. More specifically, the central control unit 19 determines which of a locally connected apparatus or a network-connected apparatus the print request has been input from. Furthermore, the central control unit 19 controls whether to preheat the fixing device 24 according to a result of the above-described determination as to the print request input source.

With the above-described configuration, the present exemplary embodiment can reduce the time of preheating the fixing device 24. In addition, in the image forming apparatus in which the time of preheating affects the life of the fixing device 24, the present exemplary embodiment having the above-described configuration can reduce the FPOT and prevent unnecessary consumption of the life of the fixing device 24 at the same time.

To paraphrase this, if a print request has been input by a user of the PC that is locally connected to the image forming apparatus 8 via the USB interface 13, the user of the locally connected PC may usually stay around the image forming apparatus 8. Accordingly, in this case, the user of the locally connected PC can obtain a print result, which is produced based on print information (print data) whose printing has been instructed by the user very soon.

On the other hand, if a user of a network-connected PC has input a print instruction, the central control unit 19 executes control for not preheating the fixing device 24. As a result, the actual preheating time can be reduced. Therefore, the present exemplary embodiment can extend the fixing device replacement time. Accordingly, the present exemplary embodiment having the above-described configuration can reduce the running costs of the image forming apparatus 8.

In the above-described first exemplary embodiment, the central control unit 19 determines the type of connection (network connection or local connection) of an apparatus connected to the image forming apparatus 8 that is the source of input of a print request the image forming apparatus 8 has received. Furthermore, the central control unit 19 determines whether to preheat the fixing device 24 according to a result of the above-described determination as to the type of connection of the apparatus connected to the image forming apparatus 8.

In a second exemplary embodiment of the present invention, the central control unit 19 of the image forming apparatus 8 determines whether a print request has been received from the user via the operation unit 12 instead of executing the determination as to the connection type of the apparatus connected to the image forming apparatus 8. More specifically, in the present exemplary embodiment, the central control unit 19 determines whether to preheat the fixing device 24 according to a result of the determination as to whether a print request has been received from the user via the operation unit 12. In the present exemplary embodiment, units, components, or the like similar to those of the first exemplary embodiment described above are provided with the same reference numerals and symbols as those of the first exemplary embodiment. Accordingly, the detailed description thereof will not be repeated here.

Figure 3:
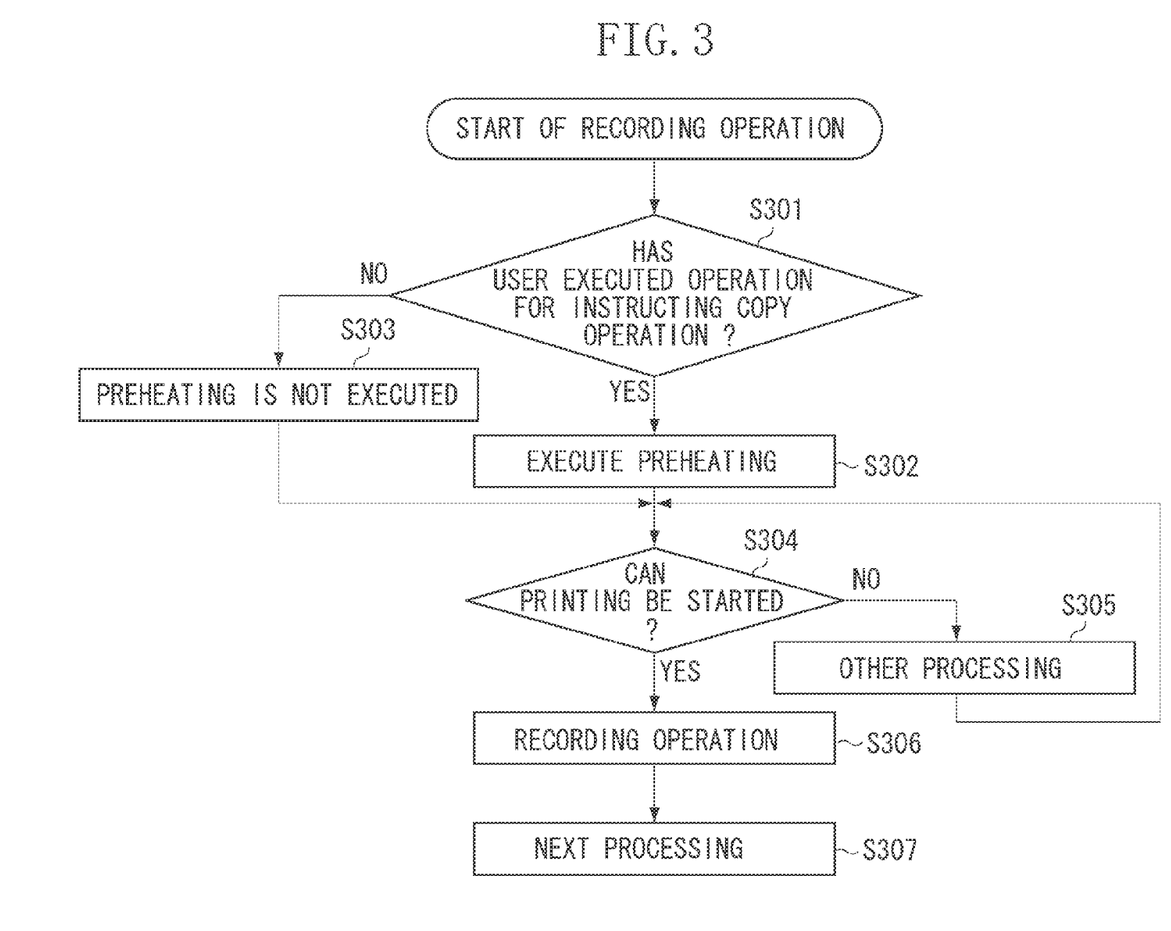
FIG. 3 is a flow chart illustrating an example of image processing executed by the image forming apparatus according to an exemplary embodiment of the present invention.

FIG. 3 is a flow chart illustrating an example of image processing executed by the image forming apparatus 8 according to the present exemplary embodiment. More specifically, in the present exemplary embodiment, the central control unit 19 determines whether a processing request input by the user is a copy request. The central control unit 19 determines whether to preheat the fixing device 24 of the image forming apparatus 8 according to a result of the request type determination processing.

Each step of the processing illustrated in the flow chart of FIG. 3 is implemented by the central control unit 19 by loading and executing a control program on the RAM 17. Processing other than that in step S301 is similar to the processing in steps S202 through S207 illustrated in FIG. 2.

The user of the image forming apparatus 8 may execute a copy function for copying a document by using the reading unit 11 in addition to or instead of executing the print function of the image forming apparatus 8. In this case, the user operates the key 20 of the operation unit 12. Now, a method according to the present exemplary embodiment will be described in detail below. More specifically, in the present exemplary embodiment, if the central control unit 19 has detected a key operation executed by the user of the image forming apparatus 8 for instructing a copy operation, the central control unit 19 executes control for preheating the fixing device 24.

Referring to FIG. 3, in step S301, the central control unit 19 determines whether the user has input an instruction for starting a copy operation by operating the key 20. If it is determined that the user has input an instruction for starting a copy operation by operating the key 20 (YES in step S301), then the processing advances to step S302. On the other hand, if it is determined that the user has executed any other operation of the key 20 (NO in step S301), then the processing advances to step S303.

More specifically, if it is detected by the central control unit 19 that the user has operated the key 20 by pressing the same, then the reading unit 11 starts reading an image of a document set by the user on a document positioning plate (not illustrated) or the ADF (not illustrated). After the document reading operation has started, the central control unit 19 transmits a signal for instructing the start of preheating of the fixing device 24 to the printer control unit 23.

After receiving image data of the document read by the reading unit 11, the central control unit 19 rasterizes the image data to be printed by the recording unit 10 on the RAM 17. In addition, the central control unit 19 transmits the rasterized image data to the recording unit 10 at a timing at which the image data rasterized on the RAM 17 becomes ready to be output. Then, the recording unit 10 starts printing the received image data.

In this case, the system controller 9 inputs an instruction for preheating the fixing device 24 if a copy operation start instruction has been input. On the other hand, if an instruction for transmitting image data has been input from the PC 4 via the network 5, the central control unit 19 executes control for not preheating the fixing device 24 to the printer control unit 23. Similarly, if an instruction for transmitting image data, i.e., an instruction for starting transmission of data, has been input from the facsimile machine 6 via the public line 7, the central control unit 19 also executes control for not preheating the fixing device 24 to the printer control unit 23.

The user who has instructed the copy operation may usually stay around the image forming apparatus 8 to wait for a copy product being output as soon as possible. Accordingly, in order to shorten the FPOT, the user executes control for preheating the fixing device 24.

On the other hand, it is not necessary for the user of the PC 4 to shorten the FPOT by preheating the fixing device 24, which may unnecessarily consume the life of the fixing device 24. Furthermore, the person who has transmitted the image via the facsimile machine 6 is usually different from the person receiving the transmitted facsimile data by using the image forming apparatus 8.

In addition, it is not usual for the person receiving the image data by using the image forming apparatus 8 to stay waiting for the image data transmitted from the facsimile machine 6 in front of the image forming apparatus 8. Accordingly, it is not necessary for the person receiving the image data by using the image forming apparatus 8 to shorten the time for printing the image data by preheating the fixing device 24 at the risk of unnecessarily consuming the life of the fixing device 24.

The processing in steps other than step S301 is similar to that described above in the first exemplary embodiment. Accordingly, the detailed description thereof will not be repeated here.

As described above, in the image forming apparatus 8, in which the time of preheating affects the life of the fixing device 24, the present exemplary embodiment having the above-described configuration can reduce the FPOT and prevent unnecessary consumption of the life of the fixing device 24 at the same time.

In the first and the second exemplary embodiments described above, the central control unit 19 executes control for preheating the fixing device 24. In a third exemplary embodiment, in executing preheating of the fixing device 24, a method for controlling a timing of executing the preheating of the fixing device 24 is changed according to an operation mode of the image forming apparatus 8. In the present exemplary embodiment, units, components, or the like similar to those of the first exemplary embodiment described above are provided with the same reference numerals and symbols as those of the first exemplary embodiment. Accordingly, the detailed description thereof will not be repeated here.

FIGS. 4A and 4B are timing charts illustrating a timing of preheating the fixing device 24, which is executed by the image forming apparatus 8 according to the present exemplary embodiment. In the examples illustrated in FIGS. 4A and 4B, the temperature is taken on the vertical axis while time is taken on the horizontal axis.

In the present exemplary embodiment, the "temperature" particularly refers to the temperature of a nip portion at the fixing device 24, i.e., a surface of a portion of the fixing device 24 on which the recording sheet is heated and pressed by a heater and a pressure roller. More specifically, the temperature at the nip portion of the fixing device 24 is predicted by calculation executed based on a temperature of the heater, which is detected by a thermister mounted to the heater, and a temperature of the pressure roller, which is detected by a thermister mounted to the pressure roller.

In addition, in the examples illustrated in FIGS. 4A and 4B, a target temperature t2 is set. The target temperature t2 is a temperature exceeding a melting point of the toner. In other words, the target temperature t2 is a temperature at which the toner can be melted and fixed on the recording sheet. The temperature of 180° C. can be set as the target temperature t2, for example. An initial temperature t0 is the temperature before starting warm-up of the heater.

For a timing of transmission of a preheat command, at timing T0, the system controller 9 transmits a preheat command to the printer control unit 23. At print command transmission timing (timing) T1, the system controller 9 gives a print instruction to the printer control unit 23. When the image data to be printed is ready, the system controller 9 inputs the print command to the printer control unit 23 and waits until the printer (the recording unit 10) becomes ready.

After the recording unit 10 has become ready for starting printing, the printer control unit 23 transmits a TOP signal to the central control unit 19 to cause the central control unit 19 to transmit image data. At timing synchronized with the transmission of the TOP signal, the central control unit 19 of the system controller 9 starts transmitting the image data to the recording unit 10.

A time limit of 3.5 seconds, for example, refers to an upper limit value of the time of preheating the heater of the fixing device 24, which is executed according to the preheat command. The time limit is set so that the life of the fixing device 24 or the photosensitive drum 32 can be extended.

In the example illustrated in FIGS. 4A and 4B, "lost heat" refers to a time lost when the print command is not transmitted from the central control unit 19 of the system controller 9 at timing T1 within the upper limit time of preheating. As illustrated in FIG. 4A, if the preheating upper limit time is exceeded, the printer control unit 23 temporarily stops warming up the heater of the fixing device 24. When the print command is transmitted from the central control unit 19 after that, the printer control unit 23 resumes the warming of the heater up to the fixable temperature. The lost heat refers to the time lost for the above-described processing.

In this case, excessive thermal energy may be applied to the fixing device 24. In this state, power consumption cannot be effectively saved. In addition, the life of the fixing device 24 or the photosensitive drum 32, to which a primary charging current is applied to be ready for printing in synchronization with the heating, may be unnecessarily consumed. The initial temperature t0 is a temperature before warm-up of the heater of the fixing device 24 is started.

If, as illustrated in FIG. 4A, the print command is transmitted at timing T1 at which the temperature has been decreased to the temperature t1 because the preheat timing has been shifted from the print timing, then the effect of shortening the FPOT may not be achieved (due to the lost time illustrated in FIG. 4A). In order to prevent this, the central control unit 19 controls the preheat timing as illustrated in FIG. 4B. In the example illustrated in FIG. 4B, the print command transmission timing is synchronized with the TOP signal output timing.

In the following description, an exemplary method for optimizing the preheat timing according to an operation mode of the image forming apparatus 8 corresponding to each functional processing executed by the image forming apparatus 8 will be described in detail below with reference to FIG. 5.

Figure 5:
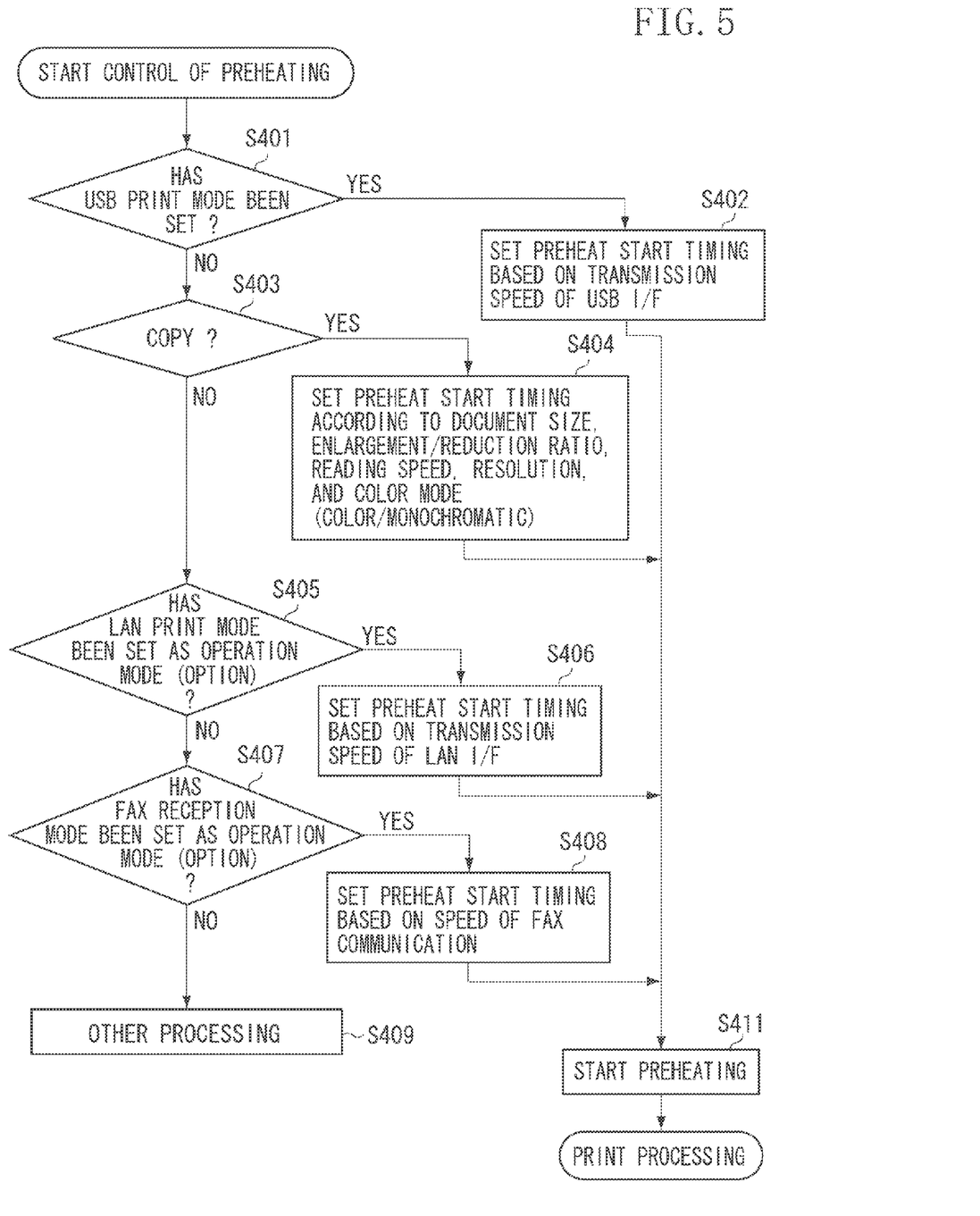
FIG. 5 is a flow chart illustrating an example of image processing executed by the image forming apparatus according to an exemplary embodiment of the present invention.

FIG. 5 is a flow chart illustrating an example of image processing executed by the image forming apparatus 8 according to the present exemplary embodiment. In the example illustrated in FIG. 5, the central control unit 19 determines the operation mode set to the image forming apparatus 8 and sets the timing of starting preheating of the fixing device 24 according to a result of the operation mode determination processing. Each of steps S401 through S410 illustrated in FIG. 5 is implemented by the central control unit 19 by loading and executing a control program on the RAM 17.

Referring to FIG. 5, in step S401, the central control unit 19 of the system controller 9 determines the operation mode set to the image forming apparatus 8. If it is determined that a USB print mode has been set as the operation mode (YES in step S401), then the processing advances to step S402. In step S402, the central control unit 19 controls the preheat timing according to the speed of transmission of data transmitted via the USB I/F cable 3. In step S410, the central control unit 19 starts preheating the fixing device 24.

On the other hand, if it is determined that the user print mode has not been set as the operation mode (NO in step S401), then the processing advances to step S403. In step S403, the central control unit 19 determines whether "COPY" has been set as the operation mode. If it is determined that "COPY" has been set as the operation mode (YES in step S403), then the processing advances to step S404.

In step S404, the central control unit 19 controls the preheat timing based on the print setting set by the user by operating the operation unit 12. In step S410, the central control unit 19 starts preheating of the fixing device 24. The print setting includes a setting related to the document size, the magnification ratio, the reading speed, the resolution, and the color mode (monochromatic/color).

On the other hand, if it is determined that "COPY" has not been set as the operation mode (NO in step S403), then the processing advances to step S405. In step S405, the central control unit 19 determines whether LAN printing has been set as the operation mode. If it is determined that LAN printing has been set as the operation mode (YES in step S406), then the processing advances to step S406. In step S406, the central control unit 19 sets the preheat start timing according to the transmission speed of the LAN I/F 14. In step S410, the central control unit 19 starts preheating of the fixing device 24.

On the other hand, if it is determined that LAN printing has not been set as the operation mode (NO in step S405), then the processing advances to step S407. In step S407, the central control unit 19 determines whether a FAX receiving mode has been set as the operation mode. If it is determined that the FAX receiving mode has been set as the operation mode (YES in step S407), then the processing advances to step S408.

In step S408, the central control unit 19 sets the preheat start timing according to the speed of facsimile communication executed via the modem 18. In step S410, the central control unit 19 starts preheating of the fixing device 24.

On the other hand, if it is determined that the FAX receiving mode has not been set as the operation mode (NO in step S407), then the processing advances to step S409. In step S409, the central control unit 19 executes other processing. The processing in steps S405 and S407 is optional.

In the present exemplary embodiment, basically, the fixing device 24 is not preheated if a LAN printing instruction or a FAX receiving instruction has been input. In addition, the operations in steps S404 and S406 can be executed if the central control unit 19 of the system controller 9 has detected that the user instruction has been input by operating the key 20.

Now, an exemplary method for switching preheating of the fixing device 24 on and off between a case where a request for printing a report has been instructed by the user and another case where automatic printing of a report has been requested will be described in detail below with reference to FIG. 6.

Figure 6:
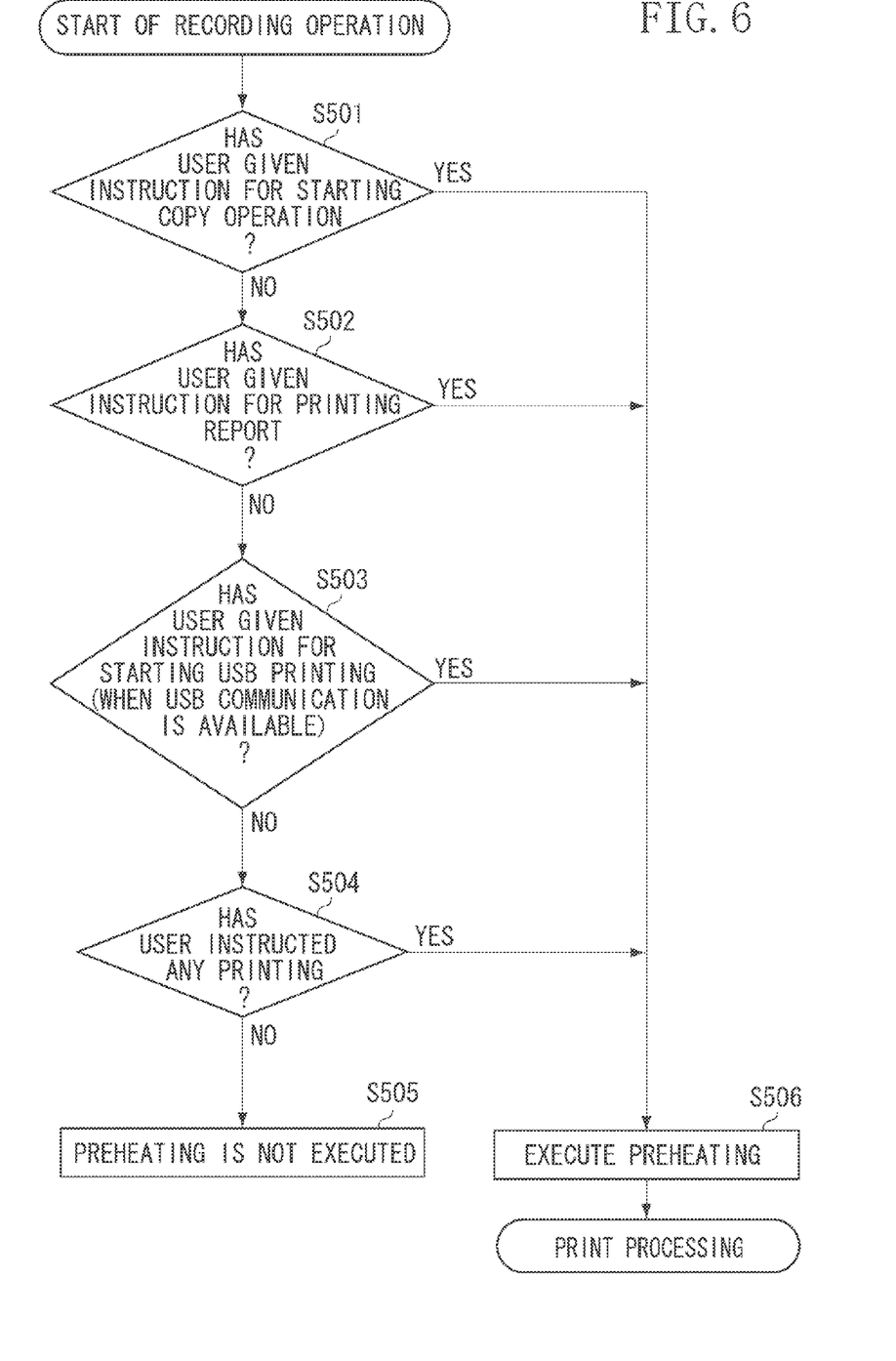
FIG. 6 is a flow chart illustrating an example of image processing executed by the image forming apparatus according to an exemplary embodiment of the present invention.

FIG. 6 is a flow chart illustrating an example of image processing executed by the image forming apparatus 8 according to a fourth exemplary embodiment of the present invention. More specifically, in this processing, the central control unit 19 prints a report when a key operation by the user is detected. Each step of the flow chart of FIG. 6 is implemented by the central control unit 19 by loading and executing a control program on the RAM 17. In the present exemplary embodiment, units, components, or the like similar to those of the first exemplary embodiment described above are provided with the same reference numerals and symbols as those of the first exemplary embodiment. Accordingly, the detailed description thereof will not be repeated here.

Referring to FIG. 6, in step S501, the central control unit 19 determines whether the user has instructed a copy operation via the operation unit 12. If it is determined that the user has instructed a copy operation (YES in step S501), then the processing advances to step S506.

In step S506, the central control unit 19 inputs an instruction to the printer control unit 23 for preheating the fixing device 24. After a TOP signal is received from the printer control unit 23, the central control unit 19 executes control for starting printing. Then the processing ends.

More specifically, the system controller 9 transmits the print data to the recording unit 10 when the image data to be printed by the recording unit 10 has become ready. Then the recording unit 10 starts printing the received print data.

On the other hand, if it is determined that a copy operation has not been instructed by the user via the operation unit 12 (NO in step S501), then the processing advances to step S502. In step S502, the central control unit 19 determines whether the user has input an instruction for printing a report via the operation unit 12.

If it is determined that the user has input an instruction for printing a report (YES in step S502), then the processing advances to step S506. In step S506, the central control unit 19 inputs an instruction to the printer control unit 23 for preheating the fixing device 24.

On the other hand, if it is determined that the user has not input an instruction for printing a report (NO in step S502), then the processing advances to step S503. In step S503, the central control unit 19 determines whether the user has input an instruction for executing USB printing. If it is determined that the user has input an instruction for executing USB printing (YES in step S503), then the processing advances to step S506. In step S506, the central control unit 19 inputs an instruction to the printer control unit 23 for preheating the fixing device 24.

On the other hand, if it is determined that the user has not input an instruction for executing USB printing (NO in step S503), then the processing advances to step S504. In step S504, the central control unit 19 determines whether the user has input an instruction for executing other printing. If it is determined that the user has input an instruction for executing other printing (YES in step S503), then the processing advances to step S506. In step S506, the central control unit 19 inputs an instruction to the printer control unit 23 for preheating the fixing device 24.

On the other hand, if it is determined that the user has not input an instruction for executing any other printing (NO in step S504), then it is determined that the fixing device 24 is not to be preheated. Then the processing returns to step S501.

In the present exemplary embodiment, the central control unit 19 identifies a user operation of the key 20 for instructing printing of a report from other key operations. Furthermore, in the present exemplary embodiment, the central control unit 19 switches preheating of the fixing device 24 on and off according to the identified user operation.

As described above, the user who stays around the image forming apparatus 8 can obtain a print result report immediately after executing printing. On the other hand, if a report is printed not based on a user instruction, the user may not necessarily stay around the image forming apparatus 8. Accordingly, in this case, it becomes unnecessary to wastefully preheat the fixing device 24. Therefore, the present exemplary embodiment having the above-described configuration can extend the time to replace the fixing device 24 of the image forming apparatus 8 with a new fixing device 24. Therefore, the present exemplary embodiment can effectively reduce the costs for the user.

Figure 7:
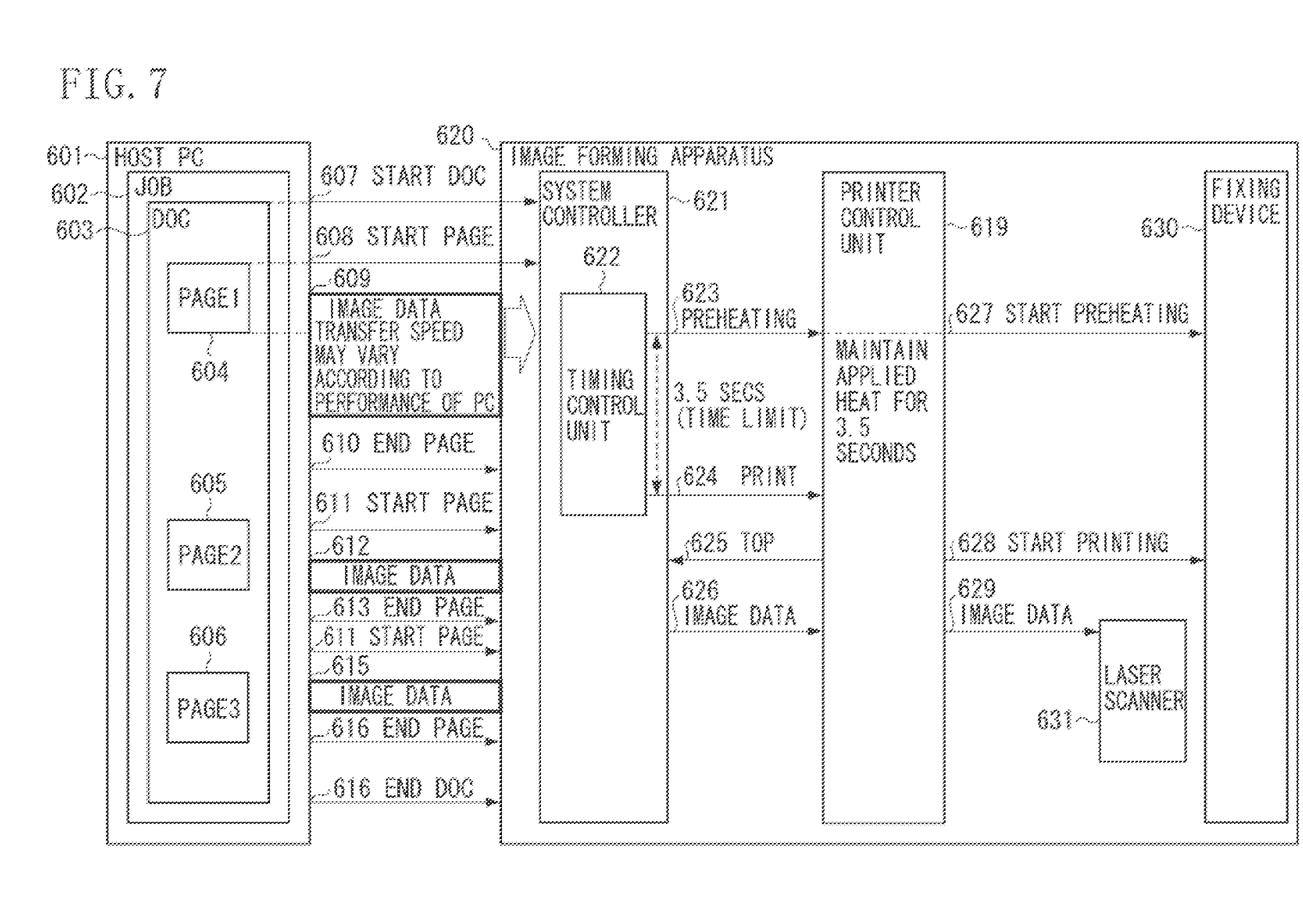
FIG. 7 illustrates an example of a printing system to which an image forming apparatus according to an exemplary embodiment of the present invention is applied.

FIG. 7 illustrates an example of a printing system to which an image forming apparatus according to a fifth exemplary embodiment of the present invention is applied. In the printing system according to the present exemplary embodiment, the PC 1 and an image forming apparatus 620 are mutually connected by a local connection method. An SFP is used as the image forming apparatus 620.

Referring to FIG. 7, a host PC 601 includes a display device, an input device, and a storage device in addition to hardware resources, such as a CPU, a ROM, and a RAM. The host PC 601 loads an operating system (OS) from the storage device onto the RAM and executes an application thereon. A printer driver for communicating with the image forming apparatus 620 has been previously installed on the storage device of the PC 601.

In the present exemplary embodiment, the printer driver transmits image data to be printed to the image forming apparatus 620. In addition, the printer driver inputs a print instruction for printing the image data to the image forming apparatus 620.

A job 602 is generated by the printer driver. The job 602 is spooled on the RAM or the storage device. The job 602 includes image data and page information necessary for the instructed printing to be executed by the image forming apparatus 620. In addition, the job 602 includes an instruction to be given to the recording unit 10.

Information "DOC" 603 includes information about a document to be printed by the image forming apparatus 620. "PAGEs" 604 through 606 includes page information about one page to be printed by the image forming apparatus 620.

A START DOC command 607 is a command which describes that the document to be printed is to be transferred from the PC 601 to the image forming apparatus 620. START PAGE commands 608, 611, and 614 describe that page data of the document that has been instructed to be printed is to be transferred from the PC 601 to the image forming apparatus 620.

Image data 609 is data that has been rendered by the PC 601. The rendered image data only causes a small image processing load on the image forming apparatus 620. Accordingly, the throughput until the image is output is substantially determined according to the speed of transmission from the PC 601.

END PAGE commands 610, 613, and 616 describe that data of one page to be printed by the image forming apparatus 620 has been completely transferred. An END DOC command 617 describes that that document data to be printed by the image forming apparatus 620 has been completely transferred.

The image forming apparatus 620 executes a print sequence for fixing a toner image that has been transferred on the recording sheet by an electrophotographic process by applying heat and pressure to the toner image to cause the toner image to melt on the recording sheet by using a fixing device 630.

A system controller 621 systematically controls the operation of the entire image forming apparatus 620. A timing control unit 622 is included in the system controller 621. The timing control unit 622 detects the speed of transmission of image data from the PC 601. In addition, the timing control unit 622 determines the preheat timing. A printer control unit 619 controls charging, exposure, development, and fixing in the electrophotographic process.

The system controller 621 inputs a preheat command 623 to the printer control unit 619 to instruct the printer control unit 619 to preheat the fixing device 630 before starting printing. The preheating of the fixing device 630, which is executed according to the preheat command, may affect the life of the fixing device 630 and the photosensitive drum, which operates in synchronization with the fixing device 630 as one of the causes thereof. Accordingly, the time of preheat executed according to the preheat command is limited to 3.5 seconds, for example.

In addition, the system controller 621 transmits a print command (signal) 624 to the printer control unit 619 before transferring the image data to a laser scanner 631. Furthermore, the printer control unit 619 transmits a TOP signal 625 to the system controller 621 as a status signal. The TOP signal 625 is a signal which indicates that the printer is ready and the image data is to be transferred to the printer.

In response to the TOP signal 625, the system controller 621 transmits the image data to the laser scanner 631 within a predetermined time. The laser scanner 631 emits a laser beam generated by modulating a laser diode on and off according to image data 629. Furthermore, the laser scanner 631 changes the electric charge of the surface of the photosensitive drum via a polygonal mirror (not illustrated). In this manner, the laser scanner 631 executes scanning by laser.

In addition, the system controller 621 transmits image data 626 to the printer control unit 619 as an image signal. Then, the image data 629 is transmitted to the laser scanner 631 via the printer control unit 619. In addition, the printer control unit 619 inputs a preheat start command 627 to the fixing device 630 in response to a preheat command 623.

The preheat start command 627 is a signal for preheating the fixing device 630 before starting printing. By using the preheat start command 627, the FPOT can be effectively reduced. In addition, the printer control unit 619 transmits a print start signal 628 to the fixing device 630 in response to the print command 624. By transmitting the print start signal 628, the printer control unit 619 notifies the fixing device 630 that the image data to be printed is ready to be transferred to the printer at any timing.

The fixing device 630 is a surf fixing device (an on-demand fixing device) having a small thermal capacity. In order to save the power consumption of the printer, the power supply to the fixing device 630 is stopped when the printer is not used. When the print command 624 or the preheat command 623 is input, the power supply to the heater is started and the fixing device 630 is powered on and activated.

As described above, the fixing device 630 includes a surf fixing device (an on-demand fixing device) 24. Accordingly, an upper limit is set to the time of preheat by the image forming apparatus. In other words, the image forming apparatus according to the present exemplary embodiment cannot execute preheating of the fixing device 24 for a time longer than a predetermined time.

Figure 8A:
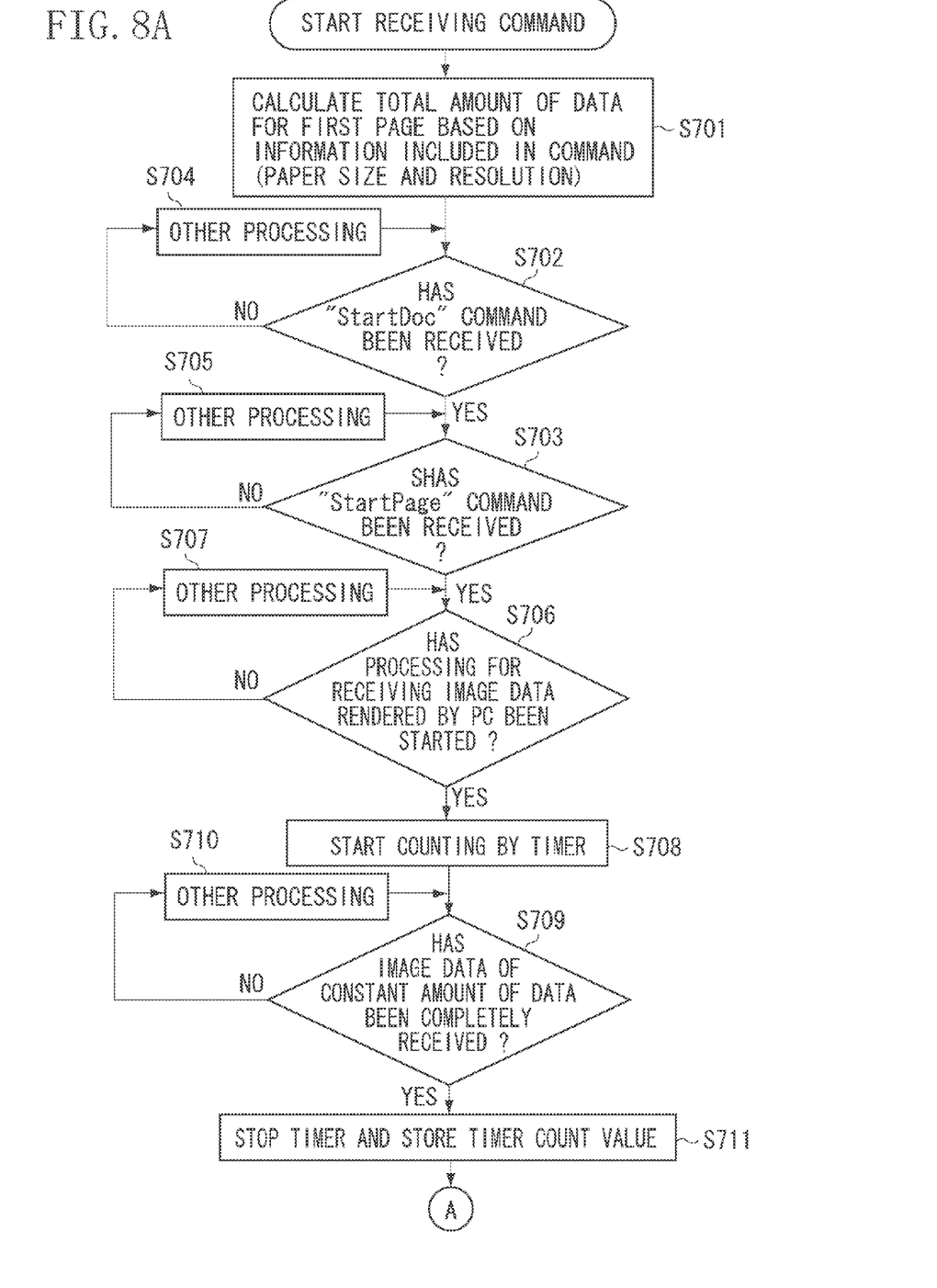
FIGS. 8A and 8B are flow charts illustrating an example of print processing executed by the image forming apparatus according to an exemplary embodiment of the present invention.
Figure 8B:
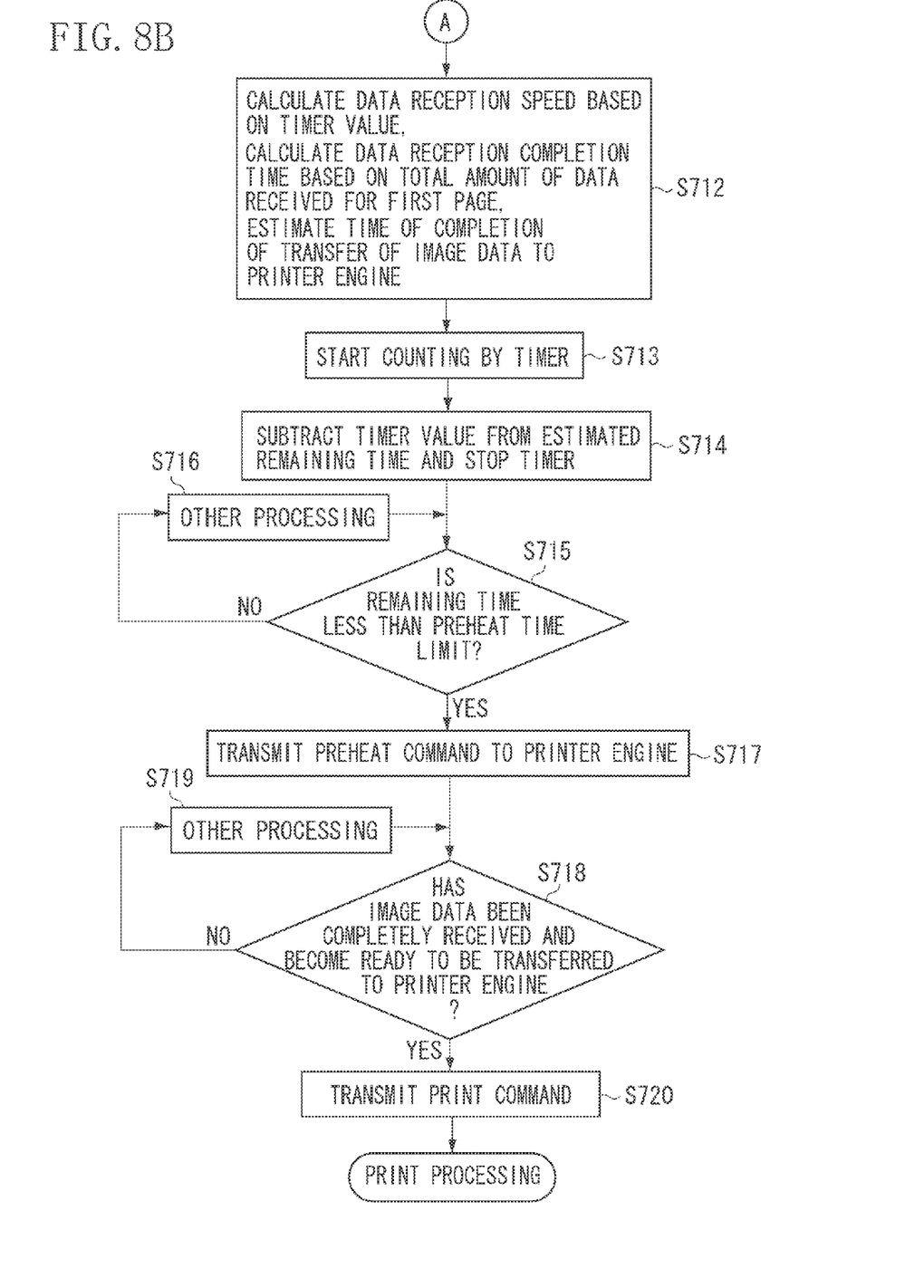

FIGS. 8A and 8B are flow charts illustrating an example of print processing executed by the image forming apparatus according to the present exemplary embodiment. Each step of the processing illustrated in FIGS. 8A and 8B is implemented by the system controller 621 and the printer control unit 619 by loading and executing a control program on a built-in memory.

In the following description, a simple method for controlling the timing of inputting the preheat command 623 and the preheat start command 627 by using the timing control unit 622 will be described in detail below with reference to FIGS. 8A and 8B. In the example illustrated in FIGS. 8A and 8B, the timing control unit 622 controls the timing of inputting the print command to a timing at which the print command can be input within the time limit for the preheat command illustrated in FIG. 4B.

When a command to instruct printing is received from the PC 601 and the printing operation is started, the system controller 621 starts the following processing.

Referring to FIG. 8A, in step S701, before receiving the image data 609 rendered by the PC 601, the system controller 621 calculates the total amount of data of the image data 609, which is image data of the first page, according to command information about the image data 609. More specifically, the system controller 621 calculates the total amount of data in order to calculate the time required until the rendered image data is completely received based on command information acquired from the host PC, such as the paper size and the resolution.

The information about the image data includes information incidental to the START DOC command 607 or the START PAGE command 608. The above-described information about the command can include the information incidental to the START DOC command 607 or the START PAGE command 608. Alternatively, information about a command that is not illustrated can be used as the above-described command information.

In step S702, the system controller 621 determines whether the image forming apparatus 620 has received, from the PC 601, the START DOC command 607, which describes that the document whose printing has been instructed is to be transferred from the PC 601 to the image forming apparatus 620. If it is determined that the image forming apparatus 620 has not received any START DOC command 607 (NO in step S702), then the processing advances to step S704. In step S704, the system controller 621 executes other processing. Then the processing returns to step S702.

On the other hand, if it is determined that the image forming apparatus 620 has received the START DOC command 607 (NO in step S702), then the processing advances to step S703. In step S703, the system controller 621 determines whether the image forming apparatus 620 has received the START PAGE command 608, which describes that the page data of the document whose print instruction has been input is to be transferred.

If it is determined that the image forming apparatus 620 has not received any START PAGE command 608 (NO in step S703), then the processing advances to step S705. In step S705, the system controller 621 executes other processing. Then the processing returns to step S703.

On the other hand, if it is determined that the image forming apparatus 620 has received the START PAGE command 608 (YES in step S703), then the processing advances to step S706. In step S706, the system controller 621 determines whether the image forming apparatus 620 has started receiving the image data rendered by the PC 601.

If it is determined that the image forming apparatus 620 has not started receiving the image data rendered by the PC 601 (NO in step S706), then the processing advances to step S707. In step S707, the system controller 621 executes other processing. Then the processing returns to step S706.

On the other hand, if it is determined that the image forming apparatus 620 has started receiving the image data rendered by the PC 601 (YES in step S706), then the processing advances to step S708. In step S708, the system controller 621 starts counting by a timer included in the system controller 621 in order to calculate a time required to complete the transfer of the image.

In step S709, the system controller 621 determines whether a predetermined amount of image data has been completely received in order to predict a time to complete the transfer of image data. If it is determined that the predetermined amount of image data has not been completely received (NO in step S709), then the processing advances to step S710. In step S710, the system controller 621 executes other processing. Then the processing returns to step S709.

On the other hand, if it is determined that the predetermined amount of image data has been completely received (YES in step S709), then the processing advances to step S711. In step S711, the system controller 621 stops the timer started by the system controller 621. In addition, the system controller 621 executes control for storing the timer value on the built-in memory.

In step S712, the system controller 621 calculates a reception speed based on the timer value stored on the built-in memory and the data amount of the predetermined amount of received data. In addition, the system controller 621 calculates a reception completion time based on the total amount of data of the first page, which is calculated based on the information acquired in step S701. Furthermore, the system controller 621 estimates a time required to complete the preparation for transferring the image data to a printer engine (an image data transfer completion time).

In step S713, in order to determine the preheat timing, the system controller 621 starts counting of the timer from the timing at which the time remaining until the image becomes ready to be transferred to the printer is calculated. In step S714, the system controller 621 subtracts the timer value calculated in step S713 from the estimated remaining time calculated in step S712 and stops the timer.

In step S715, the system controller 621 determines whether the time required until the image data becomes ready to be transferred to the printer has become within a preheat time limit. The "preheat time limit" refers to a maximum time for continuing the processing for warming up the heater of the fixing device 630 executed according to a preheat command.

If it is determined that the time required until the image data becomes ready to be transferred to the printer has not become within the preheat time limit (NO in step S715), then the processing advances to step S716. In step S716, the system controller 621 executes other processing. Then the processing returns to step S715.

In step S717, the system controller 621 transmits a preheat command to the printer to start preheating of the fixing device 630. In step S718, the system controller 621 determines whether the drawing data has been completely received and whether the data has become ready to be transferred to the printer engine.

If it is determined that the drawing data has not been completely received and that the data has not become ready to be transferred to the printer engine (NO in step S718), then the processing advances to step S719. In step S719, the system controller 621 executes other processing. Then the processing returns to step S718. On the other hand, if it is determined that the drawing data has been completely received and that the data has become ready to be transferred to the printer engine (YES in step S718), then the processing advances to step S720.

In step S720, the system controller 621 transmits the print command 624 to the printer control unit 619. In addition, the system controller 621 causes the printer engine to start the print operation and shifts to the print processing.

In the present exemplary embodiment, the system controller 621 estimates the time required until the image data from the host PC becomes ready to be printed based on the time required to transmit data of one page, which is estimated based on a result of receiving a predetermined amount of image data. In addition, the system controller 621 sets the timing of the estimated time required until printing becomes available as the timing for starting printing. Furthermore, the system controller 621 executes control for starting preheating of the fixing device 630 after the timing calculated by reversely operating the preheat upper limit time.

As described above, in the printing system according to the present exemplary embodiment, the PC 601 rasterizes (renders) an image and transmits the rendered image to the image forming apparatus 620. Therefore, the processing load on the image forming apparatus 620 that may arise in relation to image processing is very low. Accordingly, if the speed of transmission of image data from the PC 601 and the total data amount transmitted from the PC 601 are previously known, the time required until image data to be printed becomes ready to be transmitted to be printed can be readily estimated.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium). In an example, a computer-readable medium may store a program that causes an image forming apparatus to perform a method described herein. In another example, a central processing unit (CPU) may be configured to control at least one unit utilized in a method or apparatus described herein. Here, each apparatus, including the image forming apparatus, may be implemented within, include, or otherwise be connected to a CPU, where the CPU is connected to a memory and executes a variety of functions by executing a variety of application programs that are stored in the memory, such as a read only memory (ROM). The ROM may store such information as an operating system, various applications, a control program, and data. The operating system may be the software that controls the allocation and usage of hardware resources such as memory, central processing unit, disk space, and peripheral devices. A random access memory (RAM) may temporarily store the program or the data that is loaded from the ROM. The RAM also is used as a space wherein the CPU executes the variety of programs.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-276328 filed Dec. 4, 2009, which is hereby incorporated by reference herein in its entirety.

What is claimed is:

1. An image forming apparatus having an image forming unit configured to form an image on a sheet based on image data by using a recording agent, and a fixing unit configured to fix the recording agent on the sheet, the image forming apparatus comprising:
a receiving unit configured to receive, via an interface the image data and transmit the received image data to the image forming unit; and
a control unit configured to control to start raising a temperature of the fixing unit before the image data becomes ready to be transmitted to the image forming unit in a case where the interface is a predetermined type of interface and to control not to start raising the temperature of the fixing unit before the image data becomes ready to be transmitted to the image forming unit in a case where the interface is not the predetermined type of interface.

2. The image forming apparatus according to claim 1, wherein the predetermined type of interface is a universal serial bus (USB) interface.

3. An image forming apparatus having an image forming unit configured to form an image on a sheet based on image data by using a recording agent, and a fixing unit configured to fix the recording agent on the sheet, the image forming apparatus comprising:
a receiving unit configured to receive the image data and transmit the received image data to the image forming unit;
an accepting unit configured to accept a request for executing image processing; and
a control unit configured to control to start raising a temperature of the fixing unit before the image data becomes ready to be transmitted to the image forming unit in a case where the request accepted by the accepting unit is a predetermined type of request and to control not to start raising the temperature of the fixing unit before the image data becomes ready to be transmitted to the image forming unit in a case where the request accepted by the accepting unit is not the predetermined type of request.

4. The image forming apparatus according to claim 3, wherein the request accepted by the accepting unit is a request for printing a report.

5. A control method for controlling an image forming apparatus having an image forming unit configured to form an image on a sheet based on image data by using a recording agent, and a fixing unit configured to fix the recording agent on the sheet, the control method comprising:

Receiving, via an interface, the image data and transmitting the received image data to the image forming unit;
controlling to start raising a temperature of the fixing unit before the image data becomes ready to be transmitted to the image forming unit in a case where an interface is a predetermined type of interface; and
controlling not to start raising the temperature of the fixing unit before the image data becomes ready to be transmitted to the image forming unit in a case where the interface is not the predetermined type of interface.

* * * * *